United States Patent
Kraemer

(10) Patent No.: US 9,365,367 B2
(45) Date of Patent: Jun. 14, 2016

(54) PNEUMATIC CONVEYOR FOR TRANSPORTING BULK MATERIALS

(71) Applicant: Thilo Kraemer, Darmstadt (DE)

(72) Inventor: Thilo Kraemer, Darmstadt (DE)

(*) Notice: Subject to any disclaimer, the term of this patent is extended or adjusted under 35 U.S.C. 154(b) by 0 days.

(21) Appl. No.: 14/405,622

(22) PCT Filed: Apr. 24, 2013

(86) PCT No.: PCT/EP2013/058453
§ 371 (c)(1),
(2) Date: Dec. 4, 2014

(87) PCT Pub. No.: WO2013/182346
PCT Pub. Date: Dec. 12, 2013

(65) Prior Publication Data
US 2015/0125222 A1    May 7, 2015

(30) Foreign Application Priority Data
Jun. 5, 2012   (DE) .......................... 10 2012 104 868

(51) Int. Cl.
| | |
|---|---|
| B65G 53/28 | (2006.01) |
| B65G 53/06 | (2006.01) |
| B65G 53/34 | (2006.01) |
| B65G 53/60 | (2006.01) |

(52) U.S. Cl.
CPC ................ *B65G 53/06* (2013.01); *B65G 53/34* (2013.01); *B65G 53/60* (2013.01)

(58) Field of Classification Search
USPC ...................... 406/93, 106, 127, 169; 137/544
See application file for complete search history.

(56) References Cited

U.S. PATENT DOCUMENTS

| | | | |
|---|---|---|---|
| 2,539,109 A | 1/1951 | Webb | |
| 2,644,769 A | 7/1953 | Robinson | |
| 2,814,531 A | 11/1957 | Murray, Jr. | |
| 3,858,943 A | 1/1975 | Bose et al. | |
| 5,803,673 A * | 9/1998 | Reinsch ................ | B65D 88/30 406/106 |
| 6,634,832 B2 * | 10/2003 | Reid ...................... | B65G 53/30 406/106 |
| 8,882,401 B2 * | 11/2014 | Kinoshita .............. | B65G 53/40 406/106 |
| 8,900,334 B2 | 12/2014 | Kowoll et al. | |
| 2012/0111416 A1 | 5/2012 | Kowoll et al. | |

FOREIGN PATENT DOCUMENTS

| | | |
|---|---|---|
| DE | 1 286 958 B | 1/1969 |
| DE | 21 22 380 A1 | 11/1972 |
| DE | 2 212 611 A1 | 9/1973 |
| DE | 40 28 098 A1 | 3/1992 |
| DE | 41 25 938 A1 | 2/1993 |

(Continued)

OTHER PUBLICATIONS

International Search Report of PCT/EP2013/058453, mailed Jul. 23, 2013.

(Continued)

*Primary Examiner* — Joseph Dillon, Jr.
(74) *Attorney, Agent, or Firm* — Collard & Roe, P.C.

(57) ABSTRACT

A pneumatic conveyor for transporting bulk materials, in particular tablets, has a compressor for conveyor gas and has a bulk material feed and a conveyor line, in particular hose, arranged therebetween, and a bulk material discharge. To prevent contamination of the environment during operation, a shut-off device is provided between a collection volume and the conveyor line. A method for operating a pneumatic conveyor conveys sample volumes intermittently.

6 Claims, 2 Drawing Sheets

(56) References Cited

FOREIGN PATENT DOCUMENTS

Figure 1:
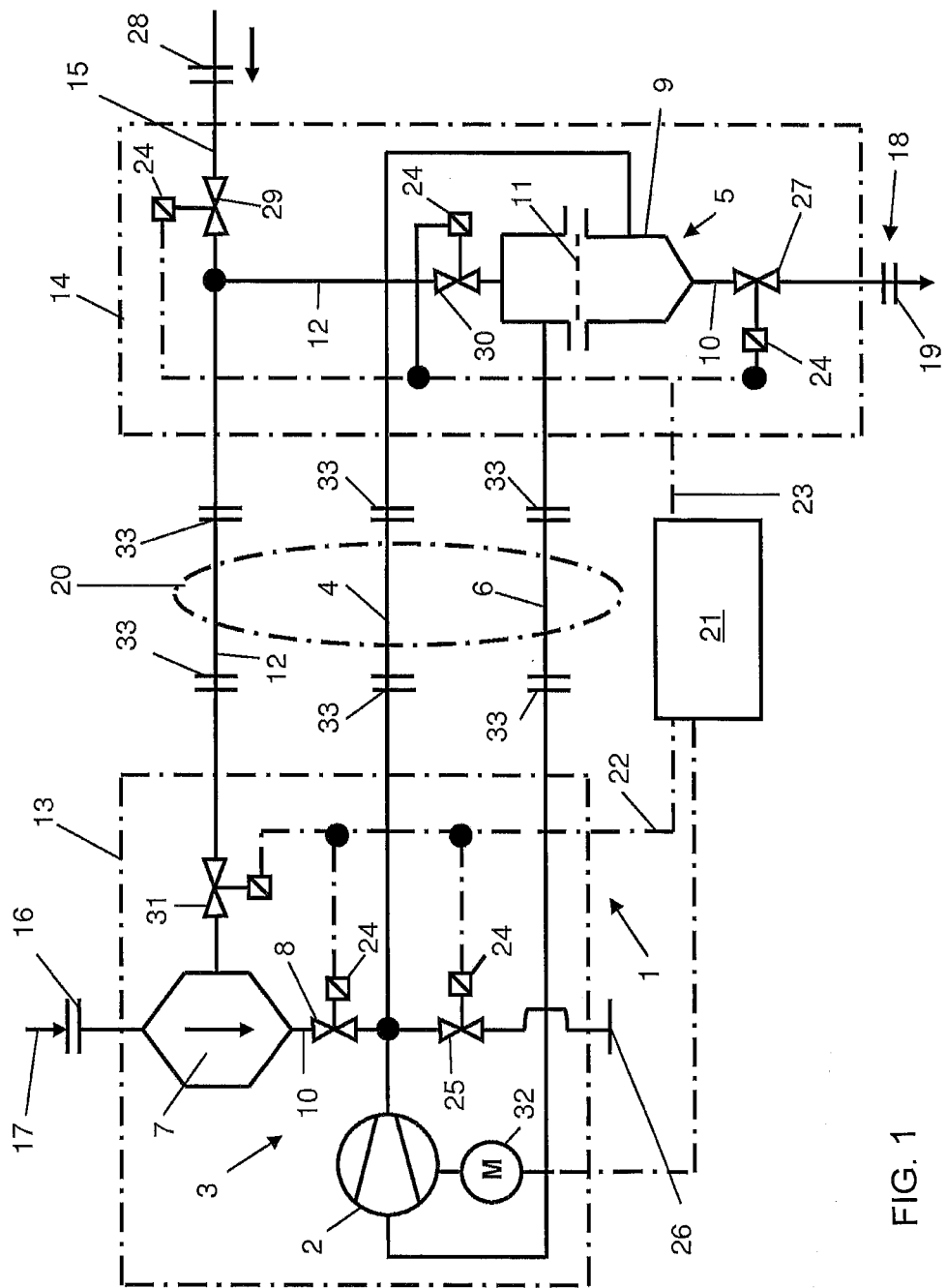

| | | |
|---|---|---|
| DE | 93 02 508 U1 | 7/1993 |
| DE | 103 49 871 A1 | 5/2005 |
| EP | 0 473 941 B1 | 3/1992 |
| EP | 0 526 808 B1 | 2/1993 |
| GB | 08311 A | 0/1914 |
| GB | 627 424 A | 8/1949 |
| GB | 995 129 A | 6/1965 |
| GB | 1 398 496 A | 6/1975 |
| WO | 2010-086008 A2 | 8/2010 |

OTHER PUBLICATIONS

German Search Report in 10 2012 104 868.1, dated Aug. 27, 2013, with English translation of relevant parts.

* cited by examiner

PNEUMATIC CONVEYOR FOR TRANSPORTING BULK MATERIALS

CROSS REFERENCE TO RELATED APPLICATIONS

This application is the National Stage of PCT/EP2013/058453 filed on Apr. 24, 2013, which claims priority under 35 U.S.C. §119 of German Application No. 10 2012 104 868.1 filed on Jun. 5, 2012, the disclosure of which is incorporated by reference. The international application under PCT article 21(2) was not published in English.

The invention relates to a pneumatic conveyor for transporting bulk materials, particularly tablets, having a compressor for conveyor gas, a bulk material feed unit and a bulk material discharge unit, and a conveying line that connects the latter, wherein a return line for the conveyor gas is provided between the bulk material discharge unit and the compressor, so that the conveyor gas is conducted in a conveyor gas circuit.

Furthermore, the invention relates to a method for operation of a pneumatic conveyor, particularly for conveying tablets.

Such a conveyor and a method for its operation, for transferring granulated or powder-form material such as sugar from a truck to a storage container of a bakery, are known from U.S. Pat. No. 2,814,531.

The sugar is transported pneumatically from the transport container into the customer's storage container. Such transport procedures can take hours until they are completed. During the transfer time, it is necessary that the operational sequences in the factory continue to take place without disruption. In this connection, it must, of course, also be possible to draw partial amounts of the sugar from the storage container, while new sugar is being transferred into the storage container.

Depending on the pressure conditions, which are a function of the operating state, it can happen, when drawing off transferred sugar, that the sugar is blown into the environment. In order to prevent this, a container having a filter is proposed, among other things, which container has pressure equalization valves on both sides of the filter, so that the pressure can be set as desired, and no sugar gets into the environment. In this container, which is disposed in the feedback line, dust also collects in front of the filter in the flow direction, which dust can then be removed from the container as needed. The interface between the storage container and the supply container is placed in such a manner that the filtered material, together with the blower and the transport tank, remains on a truck after the conveying line and the return line have been disconnected.

In the system described in U.S. Pat. No. 2,814,531, it is necessary to remove the filtered dust from the separation chamber provided, i.e. the container having the pressure equalization valves. Furthermore, it can happen that dust enters into the environment if the filter is defective.

As long as foods are involved, as provided in this prior art, such disruptions in operation can be tolerated. However, this situation can be assessed differently when conveying materials that can contaminate the environment. This requires particular attention in the production of tablets, because their ingredients can be harmful for the operating personnel if specific dosages are exceeded.

It is the task of the invention to propose a pneumatic conveyor that prevents contamination of the environment during operation, to the greatest possible extent.

This task is accomplished, in the case of a pneumatic conveyor for transporting bulk materials, particularly tablets, having a compressor for conveyor gas, and having a bulk material feed unit and a conveying line disposed in between and a bulk material discharge unit, wherein a return line for the conveyor gas is provided between the bulk material discharge unit and the compressor, in that the bulk material feed unit has a collection volume that is separated from the conveying line by means of a shutoff fitting. In this connection, the shutoff fitting hermetically seals the conveying line from the upstream collection volume. By means of this separation, the entire guide path of the pneumatic conveyor can be cleaned in suitable manner. The conveyor gas circuit and the guide paths that come into contact with the conveyed material are thereby also separated from the collection volume that lies upstream.

Transported bulk material, which is situated in the conveyor gas stream during transport, is advantageously separated out of the conveyor gas stream in a bulk material discharge unit. For this purpose, it is provided that the bulk material discharge unit has a container that is preferably configured as a cyclone, having an inflow into which the conveying line enters, preferably tangentially, and the return line exits, preferably tangentially in the same direction. In this container, the forces that act aerodynamically on the transported material are reduced. This is because the container has a greater cross-section than the conveying line and return line connected with it, so that the flow velocity in the container is reduced. In this manner, the conveyed material is separated out of the conveyor gas stream in gentle manner. The pressure loss in the container is kept low by means of the tangential entry and/or exit of the lines.

In order for no conveyed material to pass from the container into the return line, a sieve, filter or the like is disposed, preferably in the container, between conveying line and return line. It is advantageous if the container is configured to be divided horizontally. A planar sieve or filter, which reliably retains the conveyed material, can be provided to particular advantage in this parting plane. On the basis of the tangential introduction and withdrawal of the conveying gas into and out of the container, the conveyed material usually does not come into contact with the sieve or filter at all, so that these parts only have to be cleaned rarely, as an exception. Instead, the conveyed material is discharged from the gas stream by means of the centrifugal forces.

Because of the fact that at least one flushing fluid line is disposed to open into the bulk material discharge unit and/or bulk material feed unit and/or conveying line and/or return line, the entire pneumatic conveyor, in other words its parts that enter into contact with the conveyed material, can easily and conveniently be freed of possible conveyed material residues, without disassembly.

Maintenance, care, and cleaning of the system are furthermore facilitated in that the bulk material feed unit, the shutoff fitting, and the blower are disposed to form a module.

Both the return line and the conveying line open into this module, parallel to one another, in other words the module has connectors in the same direction, which significantly facilitate connecting the required lines and allow bundling of the lines.

The space requirement of the pneumatic conveyor is furthermore advantageously reduced in that the conveying line and return line and, if applicable, the flushing fluid line are conducted parallel to one another.

The same holds true for the embodiment in which the bulk material discharge unit has at least one flushing fluid inlet, if applicable and/or the container, if applicable with sieve or filter, forms a further module. This module also advantageously has connectors in the same direction, so that the conveying line and return line conducted parallel can be connected directly to the connectors of the module.

The status of the pneumatic conveyor can easily be checked visually, if at least one of the lines is configured to be transparent with a support spiral. The support spiral makes it possible to lower the pressure in the entire line path of the pneumatic conveyor, as compared with the outside atmosphere, to such an extent that no conveyed material can exit toward the outside even in the event of a leakage. In this connection, the support spiral prevents collapse of the line due to the excess pressure prevailing on the outside.

The advantages of the pneumatic conveyor according to the invention particularly can be utilized when chaining a tablet press disposed upstream and a tablet testing machine disposed downstream.

It is advantageously provided, for this purpose, that the bulk material feed device has an interface to a tablet press and/or the bulk material discharge unit has an interface to a tablet testing machine. This is because in this case, the flushing fluid can be conducted away for cleaning the pneumatic conveyor, by way of the tablet testing machine located downstream, because this machine also has a cleaning possibility with flushing fluid.

On the other hand, the tablet press located upstream makes it possible to utilize the inner atmosphere of this machine, which is hermetically sealed toward the outside, also for the pneumatic conveyor, and to expand it to cover the latter. It is therefore possible to advantageously do without special conditioning and control of the conveyor gas that is conducted in a circuit.

The task is also accomplished by means of a method for operation of a pneumatic conveyor, particularly for conveying of tablets, in which operation takes place intermittently. This is because the pneumatic conveying process of the conveyed material, from the step of introduction of an amount of the conveyed material into the conveyor circuit, is separated, both in terms of time and on the atmosphere side, between the pneumatic conveyor and a collection volume or a tablet press disposed upstream, by means of the intermittent method of operation. During a conveying cycle, the bulk material present in the collection container is transported, in each instance. No continuous conveying of the bulk material takes place.

If the conveyor gas circuit is operated at a partial vacuum, no conveyed material can exit into the environment even in the event of a disruption in operation. At most, the ambient atmosphere can enter into the conveyor gas circuit in the event of a leakage.

The method of operation according to the invention makes it possible to collect a sample lot and to convey it lot by lot. During tablet production, individual tables are randomly taken out of the product stream as a sample for quality monitoring. Such samples are compiled in the collection volume, to form a sample lot, and transported to a tablet testing machine using the conveyor according to the invention.

Product switches can advantageously take place rapidly, if cleaning takes place by means of supplying flushing fluid during a tablet production change. All of the system parts can remain assembled, because they can be cleaned in the operationally ready state, by means of supplying flushing fluid. Disassembly and separate cleaning of the individual parts is thereby advantageously made unnecessary.

The used flushing fluid can advantageously be conducted away into a system connected downstream, preferably a tablet testing machine. Such a tablet testing machine is connected to a suitable waste water line, so that the tablet fragments or dust that occurs in the tablet testing machine can be removed from the testing machine by means of flushing fluid. In this manner, no separate connection of the pneumatic conveying device to a waste water system is required.

When needed, conveying in the pneumatic conveyor can also take place under an inert gas atmosphere.

The inert gas atmosphere of a production system connected upstream, for example a tablet press, can be expanded to cover the pneumatic conveying apparatus, if maintaining the pressure and/or control of the inert gas atmosphere takes place by way of a system connected upstream. Machines for the production of tablets can be chained with the pneumatic conveyor according to the invention, in particularly advantageous manner. Chaining of these machines can take place quickly and reliably.

A preferred embodiment of the invention will be explained using a drawing. The figures show, in detail:

FIG. 1 a piping schematic of the conveyor according to the invention; and

Figure 2:
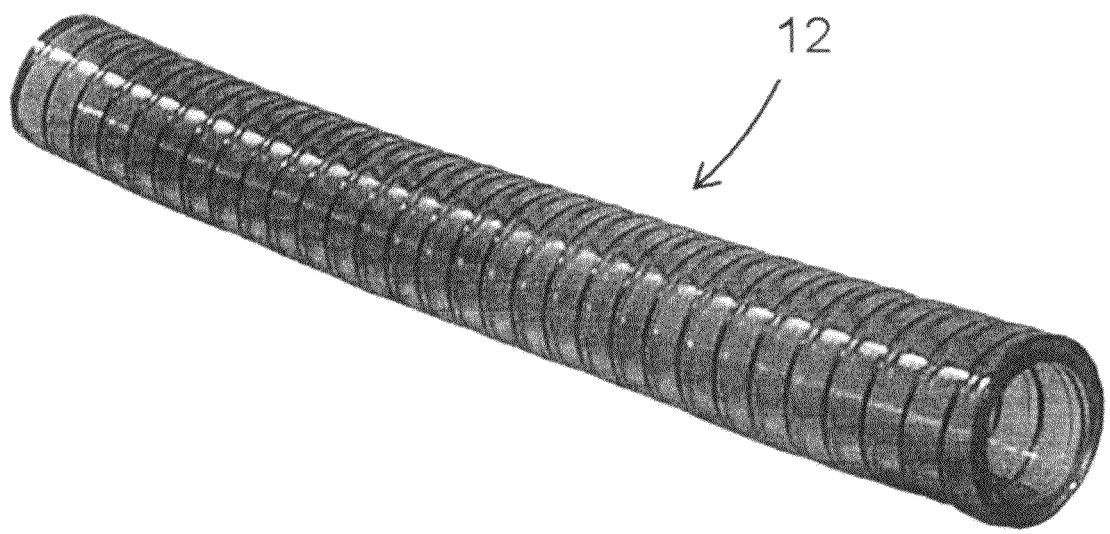

FIG. 2 a flushing fluid line configured to be transparent and having a support spiral.

FIG. 1 shows a piping schematic of the conveyor 1 according to the invention, with the most important system parts. The system is broken down into a first module 13, the boundary of which is shown with a dot-dash line. This module 13 serves for introduction of the bulk material into the pneumatic conveyor 1.

A further module 14 serves for removing the bulk material from the conveyor gas stream. These two modules are connected by means of a conveying line 4 and a return line 6, to form a conveyor gas circuit. In addition, there is a flushing fluid line 12, which serves for supplying the module 13 from the module 14. As shown in FIG. 2, the flushing fluid line 12 is configured to be transparent with a support spiral so that the status of the pneumatic conveyor can easily be checked visually. The support spiral makes it possible to lower the pressure in the entire line path of the pneumatic conveyor, as compared with the outside atmosphere, to such an extent that no conveyed material can exit toward the outside even in the event of a leakage. In this connection, the support spiral prevents collapse of the line due to the excess pressure prevailing on the outside. All three lines 4, 6, 12 are conducted parallel and can be combined to form a hose bundle 20. An overriding controller 21 serves for coordinated control of different valves of the two modules 13, 14 by means of the bus 22 to the module 13 and by means of the bus 23 to the module 14.

The module 13 has an interface 16 to a tablet press 17 toward the outside. The randomly taken samples are transferred to the collection volume 7 by way of the interface 16. A shutoff fitting 8 is provided underneath this collection volume 7, which fitting opens or closes the outlet 10 and collection container 7, using its drive 24, and thereby controls access to the conveying line 4.

The valve 25 is normally closed. It controls the path of flushing fluid to a waste water connector 26.

The conveying line 4 begins at the left on the compressor 2 and ends in the module 14, at the container 9 located on the right, which serves for uncoupling the conveyed material from the conveyor gas stream. The conveying line 4 preferably enters into the cylindrically structured container 9 tangentially, and then flows through a horizontal sieve 11 into the upper part of the container 9. The conveying gas also leaves the upper part of the container 9 tangentially, in order to enter into the return line 6, which conducts the conveying gas back to the intake side of the compressor 2. The return line therefore begins at the container 9 and ends in the module 13 on the compressor 2.

The bulk material separated in the container 9 leaves the container through the outlet 10, which can be opened and closed by the fitting 27. The fitting 27 therefore controls the interface 18 to a tablet testing machine 19 located downstream. In addition, an interface 28 to a flushing fluid supply unit is provided in the module 14, by means of which interface suitable flushing fluid, for example alternately having an acidic or basic pH, can be passed to the pneumatic conveyor. The supply is controlled by the flushing fluid inlet valve 29. Behind that, the flushing fluid line 12 branches to valve 30, which controls the supply for cleaning of the container 9, and to valve 31, which controls the feed to the collection volume 7. After a cleaning cycle, the used flushing fluid is passed to the waste water, by means of the waste water connector 26, or to the tablet testing machine 19, by way of the interface 18. In this connection, the valves 8, 25 control draining of the flushing fluid from the collection volume 7, and the valve 27 controls draining of the flushing fluid from the container 9. The drives 24 of all the valves are controlled by the controller 21, in a suitable sequence, by way of the busses 22, 23. Preferably, the interface 18 lies lower than the module 13, so that the flushing fluid can drain automatically on the basis of the existing gradient. In addition, after a flushing procedure, which is carried out in the case of a change in production, the lines can also be blown clear by means of the compressor 2. In order to monitor this procedure, the air can also be additionally heated, by means of an electric heating unit, not shown, and can be automatically controlled by means of additional temperature sensors and moisture sensors, also not shown, which monitor drying of the line.

Another possibility for cleaning within the system is possible by means of flooding the system. In this connection, the conveying line 4 and return line 6, as well as the container 9, including the compressor 2, are flooded by way of the open valves 29, 31, 8 and/or 30, while the valves 25, 27 are closed. For this purpose, the compressor 2 must, of course, be designed accordingly. If the motor 32 of the compressor 2 is then operated at a low speed of rotation by the controller 21, the cleaning fluid can take the same path that the conveyor gas takes. By means of reversing the direction of rotation, the flow direction can also be reversed, which leads to a better cleaning result. After a sufficient flushing time and closing of the valves 29, 31, 8 and/or 30, the flushing fluid can leave the lines again after the valves 25, 27 have been opened. Subsequently, the lines can then be blown free by means of operating the compressor 2 at a higher speed of rotation, whereby a construction of the container 9 in the manner of a cyclone supports the removal of residual amounts of the flushing fluid. The hose connectors 33 for the lines connecting the two modules 13, 14 all have the same direction. As a result, the hoses can be bundled. This has the advantage that the conveyor has a lesser construction volume, because the hoses can be conducted parallel.

A transport cycle is arranged in such a manner that first, individual tablets from the tablet press get into the collection volume 7 by way of the interface 16. There, the tablets brought in are collected until the desired sample collective has been reached. To transfer this sample lot into the conveying line 4, the shutoff fitting 8, for example a rotary feeder or a pusher, is opened. As a result, the tablets fall into the horizontal region of the conveying line 4. In this connection, the drain valve 25 is closed. After the shutoff fitting 8 is closed, the motor 32 of the compressor 2 is started. The conveyor gas stream generated, which can also consist of an inert gas, if necessary, drives the tablets situated in the conveying line 4 into the container 9. The tablets are braked along the cylindrical wall of the container 9 by means of the tangential entry of the conveying line 4, and are collected in the lower part of the container when the shutoff fitting 27 is closed.

Afterward, the fan can be shut off. The conveying gas, freed of the tablets, rises upward in spiral shape in the container 9, through the sieve 11, and then leaves the container tangentially or gets back to the suction side of the compressor 2 by way of return line 6.

Before starting the compressor 2 for this new transport, the shutoff fitting 8 and the drain valve 25 are closed further. During the transport procedure, after the shutoff fitting 8 has been closed, tablets can again be transferred to the collection volume 7 by way of the interface 16.

In order to draw the transported tablets out of the container 9, the shutoff fitting 27 is opened, so that the tablets get into the tablet testing machine, located downstream, under the effect of gravity, by way of the interface 18. Subsequently, a new transport cycle follows, as described above.

The pneumatic conveyor described can be used to particular advantage for chaining machines for the production of tablets.

REFERENCE NUMBER LIST

1 pneumatic conveyor
2 compressor
3 bulk material feed unit
4 conveying line
5 bulk material discharge unit
6 return line
7 collection volume
8 shutoff fitting
9 container
10 outlet
11 sieve
12 flushing fluid line
13 module
14 further module
15 flushing fluid inlet
16 interface
17 tablet press
18 interface
19 tablet press
20 hose bundle
21 controller

The invention claimed is:

1. Pneumatic conveyor for transporting bulk materials having
   a compressor for conveyor gas,
   a bulk material feed unit and
   a bulk material discharge unit, and
   a conveying line that connects the bulk material feed unit and the bulk material discharge unit,
   wherein a return line for the conveyor gas is provided between the bulk material discharge unit and the compressor, so that the conveyor gas is conducted in a conveyor gas circuit,
   wherein the bulk material feed unit has a collection volume that is separated from the conveying line by means of a shutoff fitting,
   wherein the bulk material discharge unit has a container having an outlet for removal of bulk material, into which the conveying line enters, and the return line exits, and
   wherein at least one flushing fluid line is disposed to open into at least one of the group consisting of: the bulk material discharge unit, the bulk material feed unit, the conveying line, and the return line.

2. Pneumatic conveyor according to claim 1, wherein the conveying line enters the container tangentially, and the return line exits the container tangentially in the same direction.

3. Pneumatic conveyor according to claim 2, wherein a sieve is disposed, in the container, between the conveying line and the return line.

4. Pneumatic conveyor according to claim 1, wherein the bulk material feed unit, the shutoff fitting, and the compressor are disposed so that they are combined to form a module.

5. Pneumatic conveyor according to claim 1, wherein the conveying line, the return line, and the flushing fluid line are conducted parallel and/or at least one of the lines is configured to be transparent with a support spiral.

6. Pneumatic conveyor according to claim 2, wherein the bulk material discharge unit and/or at least one flushing fluid inlet and/or the container, with sieve or filter, form a further module.

* * * * *